Patented Mar. 13, 1945

2,371,467

UNITED STATES PATENT OFFICE 2,371,467

PREPARATION OF CHOLESTEROL

Jules D. Porsche, Clarendon Hills, Ill., assignor to Armour and Company, Chicago, Ill., a corporation of Illinois No Drawing. Application September 5, 1941, Serial No. 409,684

10 Claims. (Cl. 260—397.2)

This invention relates to processes of isolating cholesterol from animal nerve tissue, such as brain and spinal cord, and it comprises processes wherein such tissue material is extracted with ethylene dichloride.

Hitherto cholesterol-containing animal tissue, such as brain and spinal cord, has been treated for the isolation of cholesterol therefrom in ways which are quite complicated and not suitable for commercial purposes. For example, it has been suggested to freeze brain tissue with liquid air and then extract the frozen material with methyl acetate.

I have sought ways by which animal tissue rich in cholesterol, and generically defined as nerve tissue, may be treated for the isolation of the cholesterol therein, and I have discovered that ethylene dichloride has the unexpected property of preferentially dissolving cholesterol to give an extract rich in cholesterol and relatively free of other tissue material.

The nerve tissue used in the present invention can be treated in any desired way prior to extraction with ethylene dichloride provided the pretreatment does not alter the composition of the lipoid fraction. For example, the nerve tissue can be partially dried, or the partially dried tissue can be rehydrated with water, or the tissue can be subjected to digestion with proteolytic enzymes. The extraction with ethylene dichloride is conducted at a temperature of about 25° C., ordinary room temperature. Temperature is not critical and this specific temperature is given for purposes of illustration only. Higher or lower temperatures can be used but to no particular advantage.

My process consists in extracting either raw, fresh or dried spinal cord or brain, by mechanical agitation with ethylene dichloride. The solvent extract thus obtained is then separated from the tissue residue and the residue again extracted one or more times with fresh portions of ethylene dichloride. The solvent extracts are then combined, filtered, and concentrated to a relatively small volume. On cooling the hot concentrated extract crude cholesterol separates which can then be recrystallized from ethylene dichloride, alcohol or any other suitable cholesterol solvent. It is not essential that the combined extracts obtained be clarified or decolorized, or filtered before concentration, but it will, of course, be apparent that these additional steps give a purer final product. Likewise, recrystallization from ethylene dichloride, alcohol or other suitable solvent for cholesterol, is not an essential requirement in the present invention, although it is advantageous when a highly purified product is desired.

I prefer to use the natural or undried tissue wherever possible, but the process can be used also in connection with the dehydrated or dried tissue also. It is desirable that there be at least 10% of water present when the extraction takes place. This desired amount of moisture may be contained in the animal tissue used, or may be added to the dried material as necessary.

I shall now give examples showing how my invention may be used for the recovery of cholesterol from spinal cord. Exactly the same process is carried out when brain tissue or other nerve tissue is used.

Example 1

100 pounds of fresh spinal cord is finely hashed and extracted by agitation with about 30 gallons of ethylene dichloride for about two hours. The mixture is then allowed to stand for about 30 minutes during which insoluble material separates and the ethylene dichloride layer is drawn off. The tissue residue is reextracted with about 20 gallons of ethylene dichloride in the same manner and the extract drawn off as before. The remaining tissue residue is extracted once more with about the same quantity of ethylene dichloride and in the same manner, and the extract recovered. The three extracts are then combined and agitated with about 5 pounds of a clarifying agent, such as a decolorizing carbon, activated earths, or the like, and the clarifying agent is removed by filtration. The filtrate is then concentrated by evaporation to a volume of about 3 gallons. The hot concentrated filtrate is then allowed to cool whereupon crude crystalline cholesterol separates. This crude product can be used as such when a highly purified material is not desired. The crude cholesterol can be obtained by filtration and recrystallized from about a gallon of hot ethylene dichloride. Further recrystallization from about 3 gallons of alcohol is desirable when a highly purified product is wanted. The resulting cholesterol has a melting point of about 147° C. to 148° C. and the yield is from 3 to 3½ pounds.

Example 2

150 pounds of vacuum dried spinal cord is hydrated with water, about 150 pounds, and the resulting mixture agitated with about 45 gallons of ethylene dichloride. The mixture is allowed to settle and the extract layer drawn off. Extraction of the residue is repeated twice in the same manner with about 30 gallons of ethylene dichloride in each instance. The combined extracts are then clarified with a decolorizing material, such as diatomaceous earth, the earth filtered off, and the extract evaporated to the point of incipient crystallization. On cooling, crystalline crude cholesterol separates from the mother liquor. The crude material is removed by filtration and recrystallized from ethylene dichloride and from methyl alcohol. The cholesterol obtained has a melting point of 148° C. and the yield is about 8.5% of the weight of the starting material.

*Example 3*

150 pounds of a commercial vacuum dried spinal cord having an excess of 10% moisture are extracted with ethylene dichloride without the addition of water but otherwise in exactly the same manner as described in Example 2. The yield of recrystallized extracted material is 7% by weight of the dry spinal cord and the product has a melting point of about 145° C.

Although it is satisfactory to first add water to the dried animal tissue, and then extract this mixture with ethylene dichloride, I find that it is advantageous to first add to the animal tissue the ethylene dichloride, and then add to this mixture the desired amount of water. By following this preferred procedure the process moves more smoothly and a more homogeneous mixture is obtained more easily. An example of this feature is found in the following example.

*Example 4*

1000 grams of dried spinal cord are agitated with 9 litres of ethylene dichloride for 50 minutes. To the mixture are then added 2 litres of water and agitation is continued for an additional hour. The whole is then allowed to settle and 5 litres of ethylene dichloride extract is drawn off. The aqueous residue is re-extracted twice with 5 litre portions of ethylene dichloride and the solvent extracts recovered and combined with the original extract. The total is then concentrated to a point where the liquid boils at about 87° C. at which time distillation is stopped. The resulting liquid residue is chilled to cause separation of cholesterol crystals which are then recovered in a basket type centrifuge. There is thus recovered 88 grams of cholesterol.

In the above examples raw spinal cord, rehydrated dried spinal cord, and dried spinal cord have been used in order to illustrate that the spinal cord starting material can be that obtained fresh from the animal, or can be dried and kept for long periods before the extraction process is performed.

I have investigated the action of other common organic solvents and have found none of them to be as satisfactory as ethylene dichloride. Propylene dichloride, for example, under the same conditions given in the above examples, gives a product having a melting point of about 143° C., thus indicating the presence of considerable impurities and the yield is only about 0.4% to 1.4%. Ethyl acetate used in the manner described above in place of ethylene dichloride gives a final product which is gummy and will not crystallize, although the yield may amount to as much as 3.5%. A petroleum solvent, such as Skellysolve, gives very poor yields, only about 0.2%. Benzene, likewise, is a poor extraction agent for cholesterol since the yield is only about 1.1%.

Although it is not necessary, the nerve tissue can be given a preliminary extraction with petroleum ether to remove fat present without appreciably affecting the yield of cholesterol obtained by subsequent extractions of ethylene dichloride.

It will also be understood that while I have, in the foregoing examples, referred to repeated extraction of tissue residue with further quantities of ethylene dichloride, this step is not essential in the practice of my process. Further extraction of the tissue residue simply increases the amount of cholesterol which can be obtained, and there is nothing critical about the number of extractions which are performed.

I claim:

1. In a process for treating nerve tissue to preserve unaltered lipoids containing therein and isolate cholesterol, the step of extracting said tissue with ethylene dichloride in the presence of water.

2. The process of treating nerve tissue containing moisture to isolate cholesterol and preserve unaltered lipoids contained therein which comprises extracting said tissue with ethylene dichloride.

3. In the process of isolating cholesterol from animal nerve tissue containing moisture and from other unaltered lipoids contained therein while preserving said lipoids in unaltered form, the steps of extracting the tissue with ethylene dichloride, concentrating the extract, and recovering cholesterol therefrom.

4. In the process of isolating cholesterol from animal nerve tissue containing moisture and from other unaltered lipoids contained therein without altering said lipoids, the steps of extracting the tissue with ethylene dichloride, clarifying the extract by contact with a solid clarifying agent, separating the clarified extract from the agent, concentrating the extract to cause the cholesterin therein to crystallize, and separating the cholesterol from the extract.

5. In the process of isolating cholesterol from animal nerve tissue containing moisture and from other unaltered lipoids also contained therein while avoiding alteration of said lipoids, the steps of extracting the tissue with ethylene dichloride, clarifying the extract by treatment with a solid clarifying agent, separating the clarified extract from the agent, concentrating the extract to cause cholesterol therein to crystallize, separating the cholesterol from the extract, and recrystallizing the cholesterol.

6. Process as in claim 1 wherein the animal nerve tissue is spinal cord.

7. Process as in claim 2 wherein the animal nerve tissue is spinal cord.

8. In the process of isolating cholesterol from dried animal nerve tissue, the steps which comprise adding ethylene dichloride and water to said tissue, and separating the ethylene dichloride phase containing the cholesterol from the phase containing the remaining material.

9. The process of isolating cholesterol from dried animal nerve tissue and from other unaltered lipoids contained therein which comprises the step of extracting the tissue with ethylene dichloride in the presence of at least 10% of water.

10. The process of isolating cholesterol from dried animal nerve tissue and from other unaltered lipoids contained therein which comprises admixing the tissue with ethylene dichloride, to this mixture adding water, and then separating the ethylene dichloride phase from the aqueous phase.

JULES D. PORSCHE.